United States Patent [19]

Keech et al.

[11] Patent Number: 5,488,736
[45] Date of Patent: Jan. 30, 1996

[54] BIDIRECTIONAL PROGRAMMABLE I/O DRIVER ARRAY

[75] Inventors: Kimberly W. Keech, Brea; Robert J. Rothaus, Yorba Linda, both of Calif.

[73] Assignee: Hughes Aircraft Company, Los Angeles, Calif.

[21] Appl. No.: 274,653

[22] Filed: Jul. 13, 1994

Related U.S. Application Data

[63] Continuation of Ser. No. 676,604, Mar. 28, 1991, abandoned.

[51] Int. Cl.⁶ .................................................. G06F 15/00
[52] U.S. Cl. ...................... 395/800; 395/832; 364/239.7; 364/DIG. 1
[58] Field of Search ................................. 395/800, 275, 395/325, 832; 364/239.7, DIG. 1

[56] References Cited

U.S. PATENT DOCUMENTS

| | | | |
|---|---|---|---|
| 3,979,730 | 9/1976 | Bennett et al. | 395/275 |
| 4,281,380 | 7/1981 | DeMesa, III et al. | 395/325 |
| 4,543,654 | 9/1985 | Jones | 370/94 |
| 4,550,402 | 10/1985 | Gable et al. | 370/85 |
| 4,611,297 | 9/1986 | Dudley et al. | 395/325 |
| 4,680,487 | 7/1987 | Kobayashi | 307/475 |
| 4,787,095 | 11/1988 | Forth et al. | 375/114 |
| 4,866,598 | 9/1989 | Sonnek et al. | 395/275 |
| 5,089,951 | 2/1992 | Iijima | 395/275 |
| 5,212,809 | 5/1993 | Oka | 455/54.1 |
| 5,214,747 | 5/1993 | Cok | 395/27 |

FOREIGN PATENT DOCUMENTS 0358501  7/1989  European Pat. Off. .

Primary Examiner—Alyssa H. Bowler
Assistant Examiner—John Harrity
Attorney, Agent, or Firm—Georgann S. Grunebach; Wanda K. Denson-Low

[57] ABSTRACT

Disclosed is a current driver that includes an array of current buffers and a program control circuit. The program control circuit responds to an externally generated programming signal to generate buffer direction control, daisy chain configuration control, and tristate control signals. The buffers of the array of current buffers are individually programmed by the direction control and the daisy chain configuration control signals to transmit data in one of a forward and reverse direction and to daisy chain a buffer to a preceding buffer, respectively. The array of current buffers is responsive to the tristate control signal to operate in a tristate mode. The array of current buffers may be reprogrammed in response to a reset signal.

3 Claims, 2 Drawing Sheets

BIDIRECTIONAL PROGRAMMABLE I/O DRIVER ARRAY

This is a continuation of application Ser. No. 07/676,604 filed Mar. 28, 1991 now abandoned.

BACKGROUND

The present invention relates generally to input/output drivers and more particularly to an input/output driver having multiple input/output buffers individually programmable to function as input or output drivers.

Input/output drivers are widely used in digital circuits to buffer input and output signals transmitted to and from different pans of a system and external devices. One type of prior an input/output (I/O) driver is a bus transceiver having multiple I/O drivers in a package and a single direction control line for all of the I/O drivers in the package. Individual direction control for the drivers is not provided. A 54AS645 bus transceiver manufactured by Texas Instruments, Inc. is an example of this type of I/O driver. Another type of prior an bus transceiver includes multiple I/O drivers in a single package and includes individual direction controls for each driver in the package. An external programming apparatus is required for programming of direction control. A 54LS449 bus transceiver manufactured by Texas Instruments, Inc. is an example of this type of I/O driver. A programmable array logic device (PAL) such as a PAL16L8 manufactured by Advanced Micro Devices is another type of prior an I/O driver. Multiple drivers are provided and the individual drivers can only programmed prior to installation of the device on a circuit card. Design changes require replacement of the device with a newly programmed PAL.

There exists a need for a programmable bidirectional input/output driver which can be used as a generic buffer in digital logic circuits and for a device with this capability that can be used in conjunction with programmable gate arrays to provide a genetic connector for use in digital logic circuits. This type of device enables system design modifications to be effected without the need to physically modify the circuitry.

An advantage of the invention is to provide a programmable bidirectional input/output driver. Another advantage of the invention is to provide a programmable bidirectional I/O driver that performs as a programmable connector between low current drive logic elements and high current drive systems. Yet another advantage of the invention is to provide an I/O driver that can be used in conjunction with programmable gate arrays to provide a genetic bidirectional input/output driver to replace existing but out-of-date input/output drivers. Still another advantage of the invention is to provide a programmable bidirectional I/O driver having multiple drivers that can be individually programmed in a daisy chain configuration. Another advantage of the invention is to provide a programmable I/O driver that can be logically reconfigured for direction without physical reconfiguration of the device. Yet another advantage of the invention is to provide a programmable bidirectional I/O driver that can be reconfigured after assembly upon a reset command.

SUMMARY OF THE INVENTION

Broadly the invention is a programmable bidirectional I/O driver that comprises an array of individual bidirectional current drivers each having a direction control signal input. A programming circuit includes an input for receiving coded programming signals and for generating I/O driver direction control signals and daisy chain control signals. Direction control and daisy chain control signal inputs are connected to receive the I/O driver direction control and daisy chain control signals, respectively, and are responsive thereto to condition the individual I/O drivers to transmit data signals in a selected forward or reverse direction and to configure the daisy chain connection of the I/O drivers. Control circuitry is provided to control the sequencing and transfer of programming, direction control, and daisy chain control signals. The I/O drivers may further include a tristate operating capability. The control circuitry includes a tristate control circuit responsive to a tristate program control signal to selectively control this capability.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and wherein.

DETAILED DESCRIPTION

Figure 1:
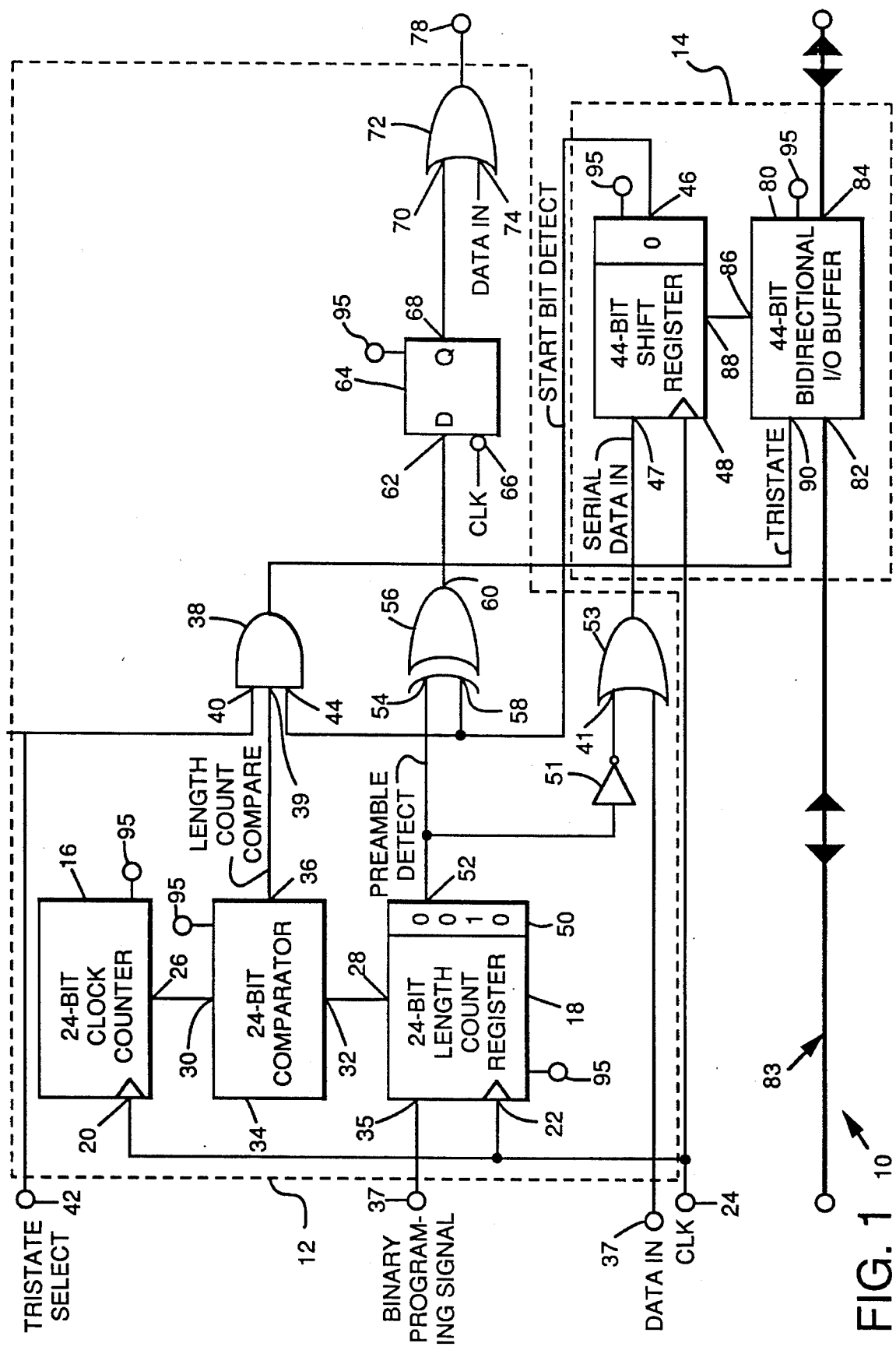
FIG. 1 illustrates a programmable bidirectional I/O driver in accordance with the principles of the present invention.

Referring now to the drawing, FIG. 1 illustrates a programmable bidirectional input/output (I/O) driver 10 in accordance with the principles of the present invention. The driver 10 comprises a program control circuit 12, and a shift register and input/output (I/O) buffer circuit 14. The program control circuit 12 includes a twenty-four bit clock counter 16 and a twenty-four bit length count register 18. The counter 16 and the register 18 have clock signal inputs 20, 22, respectively, connected to receive an externally generated clock signal (CLK) provided at clock signal input terminal 24. The counter 16 and the register 18 have twenty-four bit parallel outputs 26, 28, respectively, connected to the parallel inputs 30, 32 of a twenty-four bit comparator 34. The register 18 has a serial data input port 35 connected to a programming signal input terminal 37 that is adapted to receive an externally generated serial binary coded programming signal.

An output 36 of the comparator 34 is connected to one input 39 of a three input AND gate 38. Another input 40 of the AND gate 38 is connected to a tristate select input terminal 42 and is adapted to receive an externally generated tristate select control signal. The third input 44 of the AND gate 38 is connected to the start bit detect signal output 46 of a forty-four bit direction control signal shift register 48 that is part of the shift register and input/output (I/O) buffer circuit 14. The shift register 48 includes a serial data input port 47 connected to the output of an OR gate 53. One input of the OR gate 53 is connected to a data input terminal 41.

The length count register 18 is provided with internal preamble signal detect logic 50 having an output 52 connected to one input 54 of an EXCLUSIVE OR gate 56 and the other input of the OR gate 53 by way of an inverter 51. Another input 58 of the EXCLUSIVE OR gate 56 is connected to the start bit detect signal output 46 of the shift register 48. An output 60 of the EXCLUSIVE OR gate 56 is connected to the data input (D) 62 of a D-type flip-flop 64. The flip-flop 64 has its clock input 66 connected to the clock input terminal 24 and its Q output 68 connected to one input 70 of a two input OR gate 72. The other input 74 of the two-input OR gate 72 is connected to the serial data input terminal 37. The output of the two-input OR gate 72 is connected to a data output terminal 78.

The shift register and input/output (I/O) buffer circuit 14 also comprises an array of forty-four individual bidirectional I/O current drivers or buffers 80. The buffers 80 are bidirectional in that they can transmit data or other signals 83 from low current drive logic elements connected to low level inputs 82 to high current drive elements connected to outputs 84 or, conversely, can transmit high level signals from high current elements connected to output terminals 84 to low level logic elements connected to inputs 82. The individual buffers 80 are conditioned to transmit signals in the selected forward or reverse direction by I/O buffer direction control signals. These signals are applied to individual ones of forty-four parallel I/O driver direction control signal inputs 86 that are connected to individual ones of forty-four parallel conductors of an output bus 88 of the shift register 48.

The I/O drivers 80 may also be selectively conditioned to operate in tristate mode by applying an appropriate tristate select control signal to a tristate select control signal input terminal 90. The counter 16, the register 18, the comparator 34, the shift register 48, the flip-flop 64, and the buffers 80 each have a reset input connected to a universal reset signal input terminal 95.

The configuration data structure for the driver 10 is presented below.

HEADER

| | |
|---|---|
| 11111111 | Dummy Bits |
| 0010 | Preamble Code |
| <24 bit length count> | Configuration Program Length |
| 1111 | Dummy Bits |
| PGA PROGRAM DATA | (Optional) |
| 0<PGA Data Frame #001>111 | N Data Frames |
| 0<PGA Data Frame #002>111 | . |
| . | . |
| . | . |
| . | Postamble Code |
| 0<PGA Data Frame #N>111 | |
| 1111 | |
| I/O DRIVER DATA | |
| 0 | Start Bit |
| Data Field | Direction Control Data |
| 111 | Stop Bits |
| 1111 | Postamble Code |
| DAISY CHAIN DATA | |
| 0 | Start Bit |
| Data Field | Direction Control Data |
| 111 | Stop Bits |
| 1111 | Postamble Code |
| . | . |
| . | . |
| . | . |

In order to program the driver 10, in sequence, the header data is clocked into the length count register 18. The preamble detect output 52 of the register 18 is low and the output of the inverter 51 is high. This causes all data one's to be loaded into the shift register 48 from the output of the OR gate 53.

When the header data is fully loaded into the length count register 18, the internal preamble detect logic 50 generates a preamble detect signal at its output terminal 52. The configuration data length count is locked into the length count register 18. The output of the inverter 51 goes to zero and the direction control data is loaded into the shift register 48 through the serial input port 47. When the programming data "0" start bit reaches the final stage of the shift register 48, a start bit detect signal is generated by internal logic within the shift register 48. The programming signal is applied to the data output terminal 78 of the driver 10 in response to the start bit detect signal and operation of the logic circuit comprised of the EXCLUSIVE OR gate 56, the flip-flop 64, and the OR gate 72.

Simultaneously, the clock count and length count become equal and the output of the comparator 36 goes high. This causes the tristate select control signal, previously blocked by AND gate 38 to be applied to tristate select control input terminal 90 of the shift register 48. Selection of tristate operation is controlled by the input to the tristate select input terminal 42. The programming data loaded into the buffers 80 remains fixed until the occurrence of a reset signal.

Figure 2:
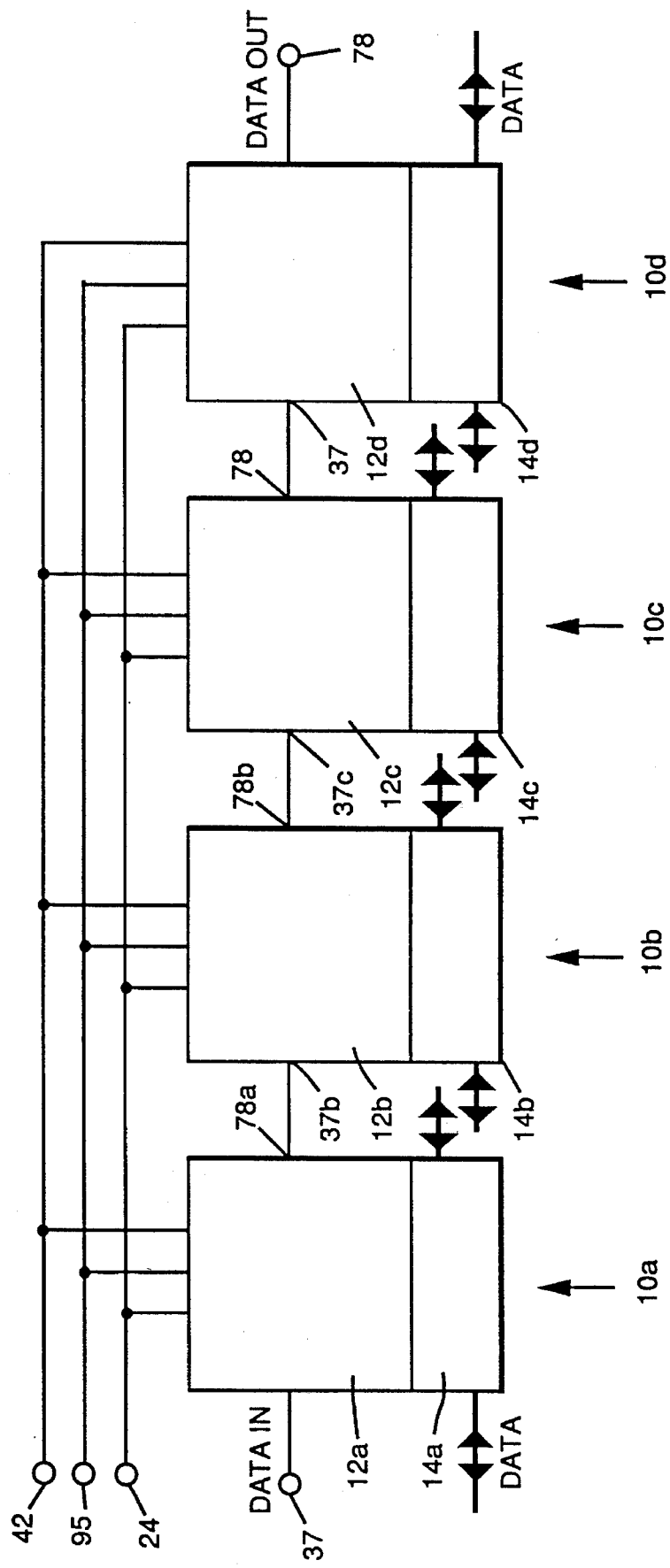
FIG. 2 illustrates daisy chaining of the driver of FIG. 1 in accordance with the invention.

FIG. 2 illustrates the connection of two or more (four are illustrated in FIG. 2) programmable I/O drivers 10a–10d in a daisy chain to expand the number of number of programmable I/O drivers available. Each programmable I/O driver 10a–10b receives the externally generated tristate select signal on terminal 42 and a clock signal on terminal 24. The second programmable I/O driver 10b receives its program data on input terminal 37b of program control circuit 12 from data output terminal 78a from the first programmable I/O driver 10a. Similarly, third programmable I/O driver 10c receives its program data on input terminal 37c from data output terminal 78b from the second programmable I/O driver 10b and so forth for any additional programmable I/O drivers. The individual I/O buffers 14a–14d are accordingly controlled to provide the selected I/O buffer direction.

In a working embodiment of the invention, the invention was implemented in a single 1.5 micron CMOS cell-based gate array. Each of the buffers 80 in the shift register and input/output (I/O) buffer circuit 14 provides 24 milliamps of output drive current. All forty-four drivers or buffers 80 were tristated. The package was provided in a 120-pin ceramic pin grid array.

Thus there has been described a new and improved programmable, bidirectional input/output driver. It is to be understood that the above described embodiment is merely illustrative of some of the many specific embodiments which represent applications of the principles of the invention. Clearly, numerous and other arrangements can be readily devised by those skilled in the art without departing from the scope of the invention.

What is claimed is:

1. A daisy-chained configuration of at least two programmable bidirectional input/output drivers, said daisy-chained configuration comprising:

first and second bidirectional input/output (I/O) drivers, each driver including:

an array of bidirectional current buffers, each current buffer having a direction control signal input terminal and first and second I/O terminals, said array further including a direction control signal register for receiving and storing direction control signals for controlling a direction of propagation of data between said first and second I/O terminals, said direction control inputs being connected to data output terminals of the direction control signal register;

a tristate control signal input for receiving an externally generated tristate control signal;

program control circuit means having a data input terminal connected to receive a binary coded programming signal and a data output terminal, said circuit means for generating a plurality of direction control signals in response to the binary coded programming signal, said programming signal includes a header data portion including a preamble code and program length data, said programming signal further including direction control data, the program control circuit means including a length count register means for receiving the header data portion, the length count register means including means for generating a preamble detect signal in response to reception of the header data portion;

wherein the direction control inputs of the bidirectional current buffers are connected to the direction control register for receiving the direction control signals, and the current buffers are individually responsive to individual ones of the direction control signals to transmit data signals in a selected direction;

said program control circuit means further including logic circuit means responsive to said preamble detect signal for permitting said direction control signal to be loaded into said direction control signal register only after receipt of said preamble, said logic circuit means connected to the length counter register and the data input terminal for controlling the loading of direction control data in the direction control register and transmitting of the direction control signals from the direction control register to the direction control signal inputs of the array of bidirectional current buffers;

wherein the array of bidirectional current buffers further includes a tristate control signal input port connected to the tristate input through the program control circuit means for receiving the tristate control signal; and wherein the array of bidirectional current buffers is operable in a tristate mode in response to the tristate control signal; and wherein said first and second drivers are connected together in a programming signal daisy chain so that said data input terminal of the second driver is connected to the data output terminal of the first driver, said header data portion of said programming signal is propagated to said first and second drivers, and said drivers are controlled by information in said header data portion so that said first driver receives and acts on direction control data specific to the driver array of said first driver from said programming signal to program the driver array of the first driver, and said second driver receives and acts on direction control data specific to the driver array of the second driver from said programming signal to program the driver array of the second driver.

2. The driver configuration of claim 1 wherein:

the direction control signal register for each said driver includes means for generating a start bit detect signal in response to completed loading of the direction control data; and wherein the program control circuit means for each said driver is responsive to the preamble detect signal to load the direction control data into the direction control signal register, and to the start bit detect and tristate control signals for applying the tristate control signal to the tristate control signal input of the array of bidirectional current buffers.

3. The driver configuration of claim 1 wherein each of said current buffers comprises means for transmitting signals from low current drive logic elements connected to said first I/O terminal to high current drive elements connected to said second I/O terminal, and conversely for transmitting signals from high current drive elements connected to said second I/O terminal to low current drive logic elements connected to said first I/O terminal.

* * * * *